United States Patent [19]

Beaujean

[11] 4,396,962

[45] Aug. 2, 1983

[54] HAVING CONVEYING MEANS FOR AN INFORMATION CARRIER AND APPARATUS FOR USING THE SAME

[75] Inventor: Joseph M. E. Beaujean, Venlo, Netherlands

[73] Assignee: Bogey B.V., Venlo, Netherlands

[21] Appl. No.: 192,041

[22] Filed: Sep. 29, 1980

[30] Foreign Application Priority Data

Oct. 1, 1979 [NL] Netherlands .......................... 7907292

[51] Int. Cl.³ ...................... G11B 23/04; G11B 25/06; G11B 15/26
[52] U.S. Cl. ................................. 360/96.5; 360/132; 242/199
[58] Field of Search ............... 360/132, 96.5, 93, 96.1; 242/199, 200–202, 204, 206, 207, 208, 75.44; 310/92, 103

[56] References Cited

U.S. PATENT DOCUMENTS 3,677,497  7/1972  Lowry et al. ....................... 360/132

3,686,470  8/1972  Stahlberg et al. ................... 360/132

FOREIGN PATENT DOCUMENTS 2245318  3/1973  Fed. Rep. of Germany ...... 360/132
2166790  3/1976  Fed. Rep. of Germany ...... 360/132

*Primary Examiner*—Alfred H. Eddleman
*Attorney, Agent, or Firm*—Martin Smolowitz

[57] ABSTRACT

A case provided with a conveying means for conveying tape-like information carrier as well as an apparatus for writing, reading or erasing information to be utilized in combination with such a case. A case for an information carrying tape, provided with two reels. No rotary parts extend through the wall. Each reel is rotatably mounted and can also move axially between a position in which it is locked and one in which it can rotate. If no (electro)magnetic field is present each reel is in the locked position. If outside the case a rotary (electro)magnetic field is generated which penetrates to a reel, this reel is moved from the locked into the unlocked position and subsequently rotated by the field.

7 Claims, 5 Drawing Figures

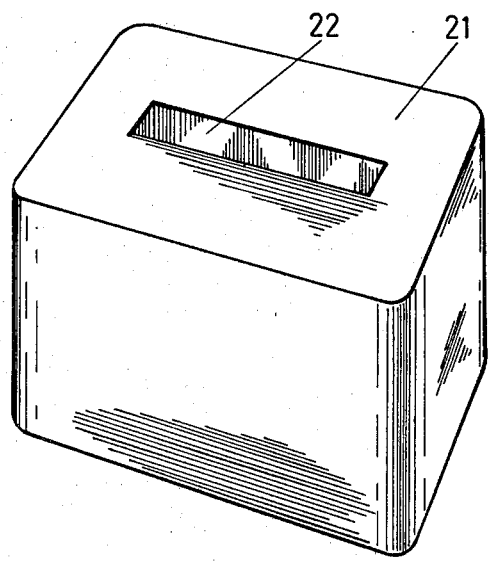
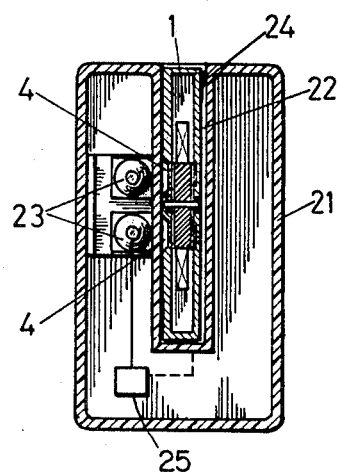

HAVING CONVEYING MEANS FOR AN INFORMATION CARRIER AND APPARATUS FOR USING THE SAME

BACKGROUND OF INVENTION

A case provided with a conveying means for conveying tape-like information carrier as well as an apparatus for writing, reading or erasing information to be utilized in combination with such a case.

The invention relates to a case provided with a conveying means for conveying a tape-like information carrier, said conveying means including two reels supported in said case, wherein no rotary parts extend through the wall of said case and at least one of said reels is of such a construction that a couple may be exerted thereon by a rotary (electro) magnetic field.

Furthermore the invention relates to an apparatus for writing, reading or erasing information to be utilized in combination with such a case provided with an information carrier.

Such a case provided with a conveying means for conveying a tape-like information carrier is known from the German "Offenlegungsschrift" No. 2,062,459. This "Offenlegungsschrift" discloses a cassette provided with a sound tape accommodated on two reels, said reels being rotatably mounted in said cassette. The axes of these reels do not extend through the housing of said cassette to the exterior. Such a design has the advantage that there will be avoided a penetration of dust into the cassette through slots in the bearings and that there will not be required complicated and consequently expensive bearings for avoiding such a penetration of dust. Each one of the reels is provided with one or more pieces of ferromagnetic material. The drive of the reels is realized by the generation outside the cassette of at least one rotary magnetic field penetrating to one of the reels in the cassette, said rotary field exerting a couple on the pieces of ferromagnetic material mounted on the relative reel. Such a rotary magnetic field may be generated for instance by rotating a permanent magnet of an electromagnet outside the cassette though close to said cassette about an axis forming the extension of an axis of one of said reels. A rotary (electro) magnetic field may, however, also be generated by means of a number of coils arranged at a fixed position outside the cassette, said coils being energized alternately.

The above discussed known case has, however, the drawback that in the absence of an exterior (electro) magnetic field the reels may move freely, so that the tape-like information carrier consequently tends to get unreeled at least partially from the reels and to take a rather arbitrary position within the cassette. Upon reinstating the use of the case the tape-like information carrier may be subject to rupture or at least damage while furthermore it will not be determined in advance which part of the tape-like information carrier will be present at the station for reading.

SUMMARY OF INVENTION

The object of the invention is to provide a case provided with a tape-like information carrier which is exempt of this drawback. The invention is based on the conception that this drawback might be avoided by means of a device which would lock the reels in the absence of an exterior (electro) magnetic field, but would release this locking condition immediately upon the occurrence of such a field.

The above mentioned object may therefore be attained by means of a case provided with a conveying means for conveying a tape-like information carrier of the type described above, said carrier in accordance with the invention being characterized in that the reels are supported in such a manner that they may be displaced in axial direction, said reels in the one extreme axial position resting against a side wall of the case or against another part fixedly connected to said case so that they are not freely rotatable, and in the other extreme axial position not resting against a side wall of the case or against another part of the case so that they may rotate freely. There are provided first means for moving and keeping each one of said reels to and in the one extreme axial position thereof, respectively, as well as second means for moving and keeping each one of said reels to and in the other extreme axial position thereof, respectively, upon the presence of a (electro) magnetic field having an axial component.

The said first means may comprise one or more springs or one of more permanent magnets optionally in combination with one or more parts of magnetizable material.

In a preferred embodiment of the invention the exterior dimensions of said case correspond to those of a commercially available tape cassette which is usually about $100 \times 64 \times 12$ mm.

The invention furthermore provides an apparatus for writing, reading or erasing information to be utilized in combination with a case provided with an information carrier in accordance with the invention, said apparatus being provided with a cavity for receiving such a case, as well as with means for keeping said case in a predetermined position within said cavity. This apparatus is provided with coils or magnets of such a design and such an arrangement that upon the presence of a case in the apparatus these coils or magnets may generate a rotary (electro) magnetic field at the location of each one of the reels, said field not only exerting a couple on said reels but also a force in the axial direction of said reels of such a magnitude that the reels will be brought and kept thereby in the second extreme axial position. Hence the coils or magnets will not only exert a rotational moment on the reels, but will also release the locking of these reels. Usually each one of the reels will be a rotary element on which the tape may be wound or from which it may be unreeled, respectively. There is, however, also conceivable a construction in which the tape is wound on the outside of the reel while said tape is simultaneously unreeled from the inside of the same reel. In said case there will also be provided a driven roller over which the tape will run, optionally in combination with a backing roller pressing the tape against a driven roller. In the present specification such a roller will also be indicated by the term reel, so that the construction described above is also covered by the term "an apparatus with two reels."

BRIEF DESCRIPTION OF DRAWINGS

The invention will now be described in further detail with respect to the drawings in which:

FIG. 3 shows a typical case holding apparatus for use with the case of the present invention; and FIG. 3a shows a cross-section view of a case holder apparatus and case operated according to the invention.

With reference to FIG. 1a, there is shown the housing 1 of a case according to the invention. Within this housing there are provided two rotatably supported (not shown in the drawing) reels, the axes of which are perpendicular to the plane of the drawing. These axes are below the points 2 and 3. At the location of each one of the reels, the side wall of the case shown in the drawing consist of a thin sheet-like material permeable to electromagnetic fields. At the location of each one of the reels, there are furthermore provided a number of reinforcing ribs 5 running radially to the location of a bearing of a reel axis. Between these reinforcing ribs 5 are provided the more or less sector shaped parts 4 consisting of thin sheet-like material. Upon utilizing the case, the coils have to be arranged against these sector shaped parts 4 and between the reinforcing ribs 5.

With reference to FIG. 1b there is shown part of a cross section through the case shown in FIG. 1a, that is to say along the line Ib—Ib. From this FIG. 1b it will be evident that the sector shaped parts 4 are of a smaller thickness than the other parts of the wall of the housing 1.

With reference to FIG. 2 there is shown a cross section of another embodiment of a case in accordance with the invention, i.e. a cross section in the plane running through one of the reel axles. The reference numeral 11 indicates the wall of the case. The reference numeral 12 indicates the axis of a reel 13 on which there is wound a tape-like carrier 14. The thickness of the reel 13 in the direction of the axle 12 is somewhat smaller than the distance between the inner surfaces of the two opposite side walls 11 of the case. Furthermore, the bearings 15 and 16 are of such a construction that the reel 13 together with the axis 12 may be slid up and down in the axial direction. Within the one side wall of the case there is provided a ring 17 of magnetic or magnetizable material. This ring exerts a downwards directed force on the magnetic or magnetizable material of the reel, whereby the reel 13 comes in abutment with the lower side wall and will consequently not be free to rotate. The upper side wall is provided with a number of recesses for receiving the energizing coils, said coils, however, not forming part of said case. These energizing coils are of such a design and have to be arranged in such a manner that upon energization they will not only exert a couple on the reel 13 but also an axial force directed upwards whereby the reel 13 is pulled upwards, so that this reel will come free from the lower side wall and is operative to be rotated. The bearing 15 is of such dimensions that the top part of the axis 12 abuts against the top of this bearing before the upper side of the reel 13 will reaches the upper side wall.

Figure 1A:
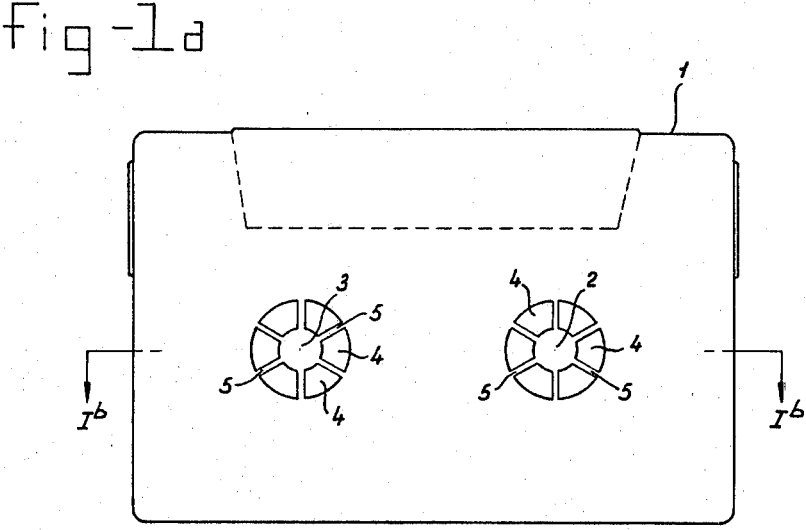
FIG. 1a shows a side elevation of a preferred embodiment of a case according to the invention.
Figure 1B:
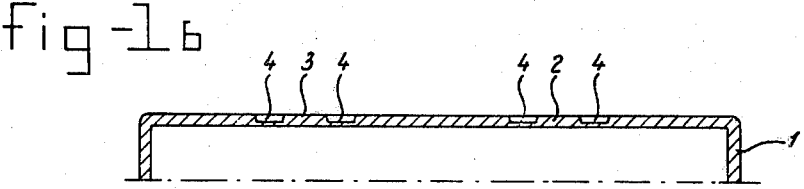
FIG. 1b represents a cross section of the case shown in FIG. 1a along the line Ib—Ib.

The present invention also relates to an apparatus for writing, reading or erasing information to be utilized in combination with a case in accordance with the invention. As shown by FIG. 3 and FIG. 3a, such an apparatus 21 is provided with a cavity 22 for receiving a case 1, as well as with spring means 24 for keeping said case in a predetermined position. If the case is provided with recesses for receiving the energizing coils (see FIG. 1), the apparatus will be provided with coils 23 operative to come in abutment with the approximately sector shaped fields 4 if the case occupies the proper position within the cavity 22.

Figure 2:
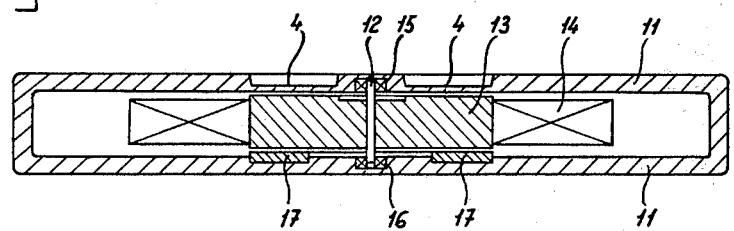
FIG. 2 shows a cross section of another preferred embodiment of a case according to the invention, i.e. a cross section in the plane running through one of the reel axes.

If the case is provided with an automatic braking device like shown in FIG. 2, the coils will be of such a construction that upon energization they will not only exert a couple but also an axially directed force on the reels.

For a proper operation of the reading, writing or erasing apparatus it is required that the tape will always be in a tensioned condition. The apparatus for writing, reading or erasing should then be provided with control means 25 exerting such a couple on each one of the reels by means of the energizing coils, that a predetermined tension parallel to the longitudinal direction of the tape will always occur in the tape-like carrier. This control means may assure that the difference between the couples exerted on each one of the reels will always equals a value dependent on the length of the tape wound on one of the reels. Information concerning this length of the tape may be supplied to the control means through the reading apparatus reading information specially provided on the tape for this purpose.

I claim:

1. A case provided with a conveying means for conveying a tape-like information carrier, said conveying means including two reels rotatably supported entirely within said case such that no rotary parts can extend through the wall of said case, at least one of said reels being constructed such that a couple may be exerted thereon by an external rotary (electro) magnetic field, wherein the reels are supported so that they may be displaced in an axial direction, said reels in one extreme axial position resting against a part fixedly connected to said case so that the reels are in a not freely rotatable locked position, and in the other extreme axial position resting away from part of the case so that they may rotate freely; first means for moving and keeping each one of said reels in the one extreme axial position thereof, respectively, and second means for moving and keeping each one of said reels in the other extreme axial position thereof, respectively, upon the presence of a (electro) magnetic field having an axial component.

2. The case according to claim 1, wherein said first means comprises at least one spring.

3. The case according to claim 1, wherein said means for moving and keeping the reels comprises at least one permanent magnet and at least one part of magnetizable material.

4. An apparatus for writing, reading or erasing information to be utilized in combination with a case provided with an information carrier, said apparatus being provided with a cavity for receiving said case and with means for keeping said case in a predetermined position within said cavity and with coils designed and arranged such that upon the presence of said case these coils may generate a rotary (electro) magnetic field at the location of each of said reels, said field exerting a couple on said reels characterized in that the arrangement of the coils is such that the generated rotary (electro) magnetic field will also exert a force on said reels in the axial direction of such a magnitude that the reels will be brought and kept thereby in the second extreme axial position.

5. The apparatus according to claim 4, wherein control means are provided for controlling the (electro) magnetic field at the location of said reels in such a manner that in the tape-like carrier wound on the reels there will always be present a predetermined tension in the longitudinal direction of said carrier.

6. A case provided with conveying means for conveying a tape-like information carrier, said conveying means including two reels each rotatably supported entirely within said case, wherein at least one of said reels is contructed such that when a couple and an axial force are exerted thereon by a rotary (electro) magnetic field, said reel can be displaced in an axial direction so that said reel in one axial position rests against a side wall of the case and is locked so as to be not freely rotatable and when in another axial position are made freely rotatable.

7. The case according to claim 6, wherein the exterior dimensions of said case correspond to those of a commercially available tape cassette and are about 100 by 64 by 12 millimeters.

* * * * *